(12) United States Patent
Imamura et al.

(10) Patent No.: US 11,162,582 B2
(45) Date of Patent: Nov. 2, 2021

(54) CONTROL SYSTEM FOR POWER TRANSMISSION UNIT

(71) Applicant: TOYOTA JIDOSHA KABUSHIKI KAISHA, Toyota (JP)

(72) Inventors: Tatsuya Imamura, Okazaki (JP); Hiroaki Ebuchi, Hadano (JP); Hiroyuki Shioiri, Yokohama (JP); Takahito Endo, Sunto-gun (JP); Hidekazu Nagai, Susono (JP); Yoichiro Isami, Mishima (JP); Hirotsugu Yoshino, Sunto-gun (JP); Hiroki Yasui, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/097,527

(22) Filed: Nov. 13, 2020

(65) Prior Publication Data
US 2021/0172517 A1 Jun. 10, 2021

(30) Foreign Application Priority Data
Dec. 5, 2019 (JP) .............................. JP2019-220466

(51) Int. Cl.
*F16H 61/664* (2006.01)
*F16H 61/04* (2006.01)
*F16H 63/30* (2006.01)

(52) U.S. Cl.
CPC ....... *F16H 61/664* (2013.01); *F16H 61/0403* (2013.01); *F16H 63/304* (2013.01);
(Continued)

(58) Field of Classification Search
CPC .. F16H 61/664; F16H 61/0403; F16H 63/304; F16H 2061/0422; F16H 2063/3056
See application file for complete search history.

(56) References Cited

U.S. PATENT DOCUMENTS 8,469,859 B2 * 6/2013 Kimura ............... F16H 63/3026 477/5
8,636,621 B2 * 1/2014 Kimura .................. B60L 50/61 477/18
(Continued)

FOREIGN PATENT DOCUMENTS

EP 3 483 481 A1 5/2019
GB 2 506 601 A 4/2014
(Continued)

OTHER PUBLICATIONS

Machine translation of JP2016175575 filed Jul. 1, 2021 (Year: 2021).*

*Primary Examiner* — Tisha D Lewis
(74) *Attorney, Agent, or Firm* — Oliff PLC

(57) ABSTRACT

A control system for a power transmission unit configured to shift an operating mode smoothly by manipulating engagement devices, and to simplify a structure of the power transmission unit. The control system is configured to reduce a speed difference between an axially stationary engagement element and a reciprocatable engagement element of a second engagement device when shifting from a first continuously variable mode to a second continuously variable mode by engaging the second engagement device. After the second engagement device has been engaged completely, a first engagement device is disengaged.

8 Claims, 10 Drawing Sheets

(52) U.S. Cl.
CPC ............... *F16H 2061/0422* (2013.01); *F16H 2063/3056* (2013.01)

(56) References Cited

U.S. PATENT DOCUMENTS

| | | | | |
|---|---|---|---|---|
| 9,528,603 | B2* | 12/2016 | Maki | ........................ F16H 63/18 |
| 2016/0368361 | A1 | 12/2016 | Endo et al. | |
| 2021/0163022 | A1* | 6/2021 | Fukada | ............... B60W 50/029 |

FOREIGN PATENT DOCUMENTS

| | | | | | |
|---|---|---|---|---|---|
| JP | H07-127670 | A | | 5/1995 | |
| JP | 2016175575 | A | * | 10/2016 | ............. B60K 6/445 |
| JP | 2017-007437 | A | | 1/2017 | |

\* cited by examiner

Fig. 4

| Operating Mode | | CL1 | CL2 | Brake 34 | MG1 | MG2 | ENG |
|---|---|---|---|---|---|---|---|
| HV Mode | HV-Low Mode | ● | — | — | G | M | ON |
| | HV-High Mode | — | ● | — | G | M | ON |
| | Fixed Mode | ● | ● | — | | M | ON |
| EV Mode | Dual-Motor Mode, EV-Low Mode | — | — | ● | M | M | OFF |
| | Dual-Motor Mode, EV-High Mode | — | ● | ● | M | M | OFF |
| | Single-Motor Mode | — | — | — | | M | OFF |

CONTROL SYSTEM FOR POWER TRANSMISSION UNIT

CROSS-REFERENCE TO RELATED APPLICATIONS

The present disclosure claims the benefit of Japanese Patent Application No. 2019-220466 filed on Dec. 5, 2019 with the Japanese Patent Office, the disclosures of which are incorporated herein by reference in its entirety.

BACKGROUND

Field of the Disclosure

Embodiments of the present disclosure relates to the art of a control system for a power transmission unit configured to selectively establish a continuously variable mode in which a speed ratio between an input member and an output member can be changed continuously by manipulating at least two engagement devices.

Discussion of the Related Art

JP-A-2017-007437 describes a hybrid drive unit in which a speed of an engine is changed continuously by a motor. In the hybrid drive unit taught by JP-A-2017-007437, an output element of a first planetary gear unit connected to both of the engine and a first motor is connected to a reaction element of a second planetary gear unit, and an output element of the second planetary gear unit is connected to an output gear. The hybrid drive unit taught by JP-A-2017-007437 is provided with a first clutch that is engaged to connect an input element of the second planetary gear unit to the engine or an input element of the first planetary gear unit, and a second clutch is that is engaged to rotate the second planetary gear unit integrally. According to the teachings of JP-A-2017-007437, a dog clutch is adopted as the first clutch and the second clutch, respectively. In the hybrid vehicle taught by JP-A-2017-007437, a speed of the engine can be changed by changing a speed of the first motor while engaging one of the first clutch and the second clutch. In other words, a speed ratio between the engine and the output member can be changed continuously by the motor.

JP-A-H07-127670 describes a shift controller for manipulating a clutch and a brake of a power transmission unit such as a continuously variable transmission or an automatic transmission. In the power transmission unit described in JP-A-H07-127670, a plurality of synchronizers are arranged in an axial direction, and a gear stage is shifted by engaging and disengaging synchronizers by shift forks connected to a shift drum respectively through shift rods. Specifically, the same number of shift grooves as the shift rods are formed on an outer surface of the shift drum. A roller is attached to one end of the shift rod through a cylindrical member fitted onto the shift drum, and the roller is fitted into the shift groove. The shift fork is attached to the other end of the shift rod, and the shift fork is engaged with the synchronizer. In the power transmission unit described in JP-A-H07-127670, therefore, the shift fork is reciprocated by rotating the shift drum to engage or disengage the synchronizer.

JP-A-2017-007437 is silent about an actuator for actuating the first clutch and the second clutch. In order to actuate the first clutch and the second clutch described in JP-A-2017-007437, the shift drum and the shift rod described in JP-A-H07-127670 may be applied to the hybrid drive unit taught by JP-A-2017-007437. However, given that dog clutches are adopted as the first clutch and the second clutch in the hybrid drive unit taught by JP-A-2017-007437, and that the shift drum and the shift rod described in JP-A-H07-127670 are employed to actuate the dog clutches, the dog clutches may not be actuated smoothly. That is, in the power transmission unit described in JP-A-H07-127670, an input member and an output member of the synchronizer may be synchronized with each other smoothly by rotating the shift drum to reciprocate the shift fork. However, the dog clutch does not have a synchronizing function, therefore, interference between teeth may be caused by merely rotating the shift drum. Even if the dog clutch is engaged, torque may be changed abruptly and engagement shock may be generated. In addition, when disengaging the dog clutch by withdrawing the shift fork, one set of teeth may not be disengaged smoothly from the other set of teeth due to friction, and eventually disengaged abruptly from the other set of teeth. Consequently, the torque may also be changed abruptly and engagement shock may also be generated. Further, the synchronizer described in JP-A-H07-127670 consists of a number of components including a synchronizer ring. Therefore, a large space is required to arrange the synchronizer in a shifting mechanism, and a manufacturing cost of the synchronizer is rather expensive.

SUMMARY

Aspects of the present disclosure have been conceived noting the foregoing technical problems, and it is therefore an object of the present disclosure to provide a control system for a power transmission unit configured to shift an operating mode smoothly by manipulating engagement devices, and to simplify a structure of the power transmission unit.

The control system according to the exemplary embodiment of the present disclosure is applied to a power transmission unit comprising: an input member; an output member that outputs torque delivered from the input member; a first engagement device that is engaged to establish a first continuously variable mode in which a speed ratio between the input member and the output member may be varied continuously; and a second engagement device that is engaged to establish a second continuously variable mode that is different from the first continuously variable mode, in which a speed ratio between the input member and the output member may also be varied continuously. The first engagement device comprises an axially stationary engagement element having engagement teeth and a reciprocatable engagement element having engagement teeth, and the engagement teeth of the axially stationary engagement element and the engagement teeth of the reciprocatable engagement element are engaged with each other to transmit torque. The second engagement device also comprises an axially stationary engagement element having engagement teeth and a reciprocatable engagement element having engagement teeth, and the engagement teeth of the axially stationary engagement element and the engagement teeth of the reciprocatable engagement element are engaged with each other to transmit torque. The power transmission unit further comprises: a guide mechanism that establishes a thrust force to reciprocate the reciprocatable engagement element of the first engagement device and the reciprocatable engagement element of the second engagement device respectively; and an actuator that actuates the guide mechanism. The guide mechanism is actuated by the actuator in a direction different from a direction to engage and disengage the engagement teeth of the reciprocatable engagement element of the first engagement device with/from the engagement teeth of the axially stationary engagement element of the first engagement device and a direction to engage and disengage the engagement teeth of the reciprocatable engagement element of the second engagement device with/from the engagement teeth of the axially stationary engagement element of the second engagement device. In order to achieve the above-explained objectives, according to the exemplary embodiment of the present disclosure, the control system is provided with a controller that shifts an operating mode from the first continuously variable mode to the second continuously variable mode by disengaging the first engagement device being engaged while engaging the second engagement device being disengaged. Specifically, the controller is configured to: execute a synchronization control to reduce a speed difference between the axially stationary engagement element and the reciprocatable engagement element of the second engagement device when shifting the operating mode from the first continuously variable mode to the second continuously variable mode; actuate the guide mechanism by the actuator in the direction to engage the engagement teeth of the reciprocatable engagement element of the second engagement device with the engagement teeth of the axially stationary engagement element of the second engagement device when the speed difference is reduced equal to or less than a predetermined value; and actuate the guide mechanism by the actuator in the direction to disengage the engagement teeth of the reciprocatable engagement element of the first engagement device from the engagement teeth of the axially stationary engagement element of the first engagement device, after the second engagement device has been engaged completely.

In a non-limiting embodiment, the controller may be further configured to reduce torque applied to the first engagement device, before actuating the guide mechanism by the actuator in the direction to disengage the engagement teeth of the reciprocatable engagement element of the first engagement device from the engagement teeth of the axially stationary engagement element of the first engagement device after the second engagement device has been engaged completely.

In a non-limiting embodiment, the guide mechanism may comprise: a cam surface that actuates the reciprocatable engagement element of the first engagement device; another cam surface that actuates the reciprocatable engagement element of the second engagement device; a cam follower that is reciprocated along the cam surface to establish the thrust force to reciprocate the reciprocatable engagement element of the first engagement device; and another cam follower that is reciprocated along said another cam surface to establish the thrust force to reciprocate the reciprocatable engagement element of the second engagement device.

In a non-limiting embodiment, the guide mechanism may further comprise a rotary member having a circular cross-section that is rotated by the actuator. The cam surface may include a cam groove that is formed on an outer circumferential surface of the rotary member, and said another cam surface may include another cam groove that is formed on the outer circumferential surface of the rotary member.

In a non-limiting embodiment, the power transmission unit may further comprise: an elastic member that is interposed between the cam follower and the axially stationary engagement element or the reciprocatable engagement element of the first engagement device to transmit the thrust force therebetween; and another elastic member that is interposed between said another cam follower and the axially stationary engagement element or the reciprocatable engagement element of the second engagement device to transmit the thrust force therebetween.

In a non-limiting embodiment, the power transmission unit may further comprise: a first differential mechanism that performs a differential action among a first input element to which the torque is delivered from an engine via the input member, a first reaction element that is connected to a first rotary machine having a generating function, and a first output element; a second differential mechanism that performs a differential action among a second reaction element that is connected to the first output element, a second output element that is connected to the output member, and a second input element; and a second rotary machine that generates torque by supplying electric power thereto from the first rotary machine. The input member or the first input element may be selectively connected to the second input element by any one of the first engagement device and the second engagement device, and at least any two of the second input element, the second output element, and the second reaction element may be selectively connected to each other by the other one of the first engagement device and the second engagement device.

In a non-limiting embodiment, the controller may be further configured to maintain current engagement states of the first engagement device and the second engagement device when starting or stopping the engine.

In a non-limiting embodiment, the controller may be further configured to disengage one of the first engagement device and the second engagement device after engaging the other one of the first engagement device and the second engagement device, when disengaging the one of the first engagement device and the second engagement device.

Thus, the operating mode of the power transmission unit to which the control system according to the exemplary embodiment of the present disclosure is applied is shifted between the first continuously variable mode and the second continuously variable mode by manipulating the first engagement device and the second engagement device. In the first continuously variable mode and second continuously variable mode, a speed ratio between the input member and the output member may be varied continuously. For example, the operating mode is shifted from the first continuously variable mode to the second continuously variable mode by disengaging the first engagement device being engaged while engaging the second engagement device being disengaged. In this situation, since a vehicle having the power transmission unit according to the exemplary embodiment of the present disclosure is propelled in the first continuously variable mode, the speed ratio between the input member and the output member may be varied continuously. In this case, therefore, the synchronization control is executed to reduce a speed difference between the axially stationary engagement element and the reciprocatable engagement element of the second engagement device to be engaged. When the speed difference between the axially stationary engagement element and the reciprocatable engagement element of the second engagement device is reduced to zero or equal to or lower than a predetermined value, the guide mechanism is actuated by the actuator in the direction to engage the reciprocatable engagement element of the second engagement device with the axially stationary engagement element of the second engagement device. According to the exemplary embodiment of the present disclosure, therefore, the second engagement device may be engaged smoothly. In addition, since the speed difference between the axially stationary engagement element and the reciprocatable engagement element of the second engagement device has been reduced, a large engagement shock will not be generated even if a rotational speed is changed as a result of engaging the second engagement device. According to the exemplary embodiment of the present disclosure, the guide mechanism is actuated again by the actuator in the direction to disengage the reciprocatable engagement element of the first engagement device from the axially stationary engagement element of the first engagement device, after the second engagement device has been engaged completely. That is, the first engagement device and the second engagement device may be actuated by the common actuator and the guide mechanism. According to the exemplary embodiment of the present disclosure, therefore, the number of parts required to shift the operating mode can be reduced. For this reason, a structure of the power transmission unit can be simplified to be downsized, and in addition, a manufacturing cost of the power transmission unit can be reduced.

As described, since the first engagement device is disengaged in the continuously variable mode in which the speed ratio between the input member and the output member may be varied continuously, a load acting between the reciprocatable engagement element and the axially stationary engagement element of the first engagement device has already been reduced when disengaging the first engagement device. According to the exemplary embodiment of the present disclosure, therefore, the reciprocatable engagement element of the first engagement device may be disengaged smoothly and certainly from the axially stationary engagement element of the first engagement device. That is, a required thrust force to disengage the first engagement device is small. For this reason, the actuator, the guide mechanism and so on may be downsized and hence the power transmission unit may be further downsized.

If the reciprocatable engagement element is actuated by the cam follower toward the axially stationary engagement element in a situation that a speed difference therebetween has not yet been reduced sufficiently, the reciprocatable engagement element will be pushed back by the elastic member to prevent an undesirable engagement. Even if the reciprocatable engagement element is engaged with the axially stationary engagement element eventually, the speed difference therebetween has already been reduced sufficiently. According to the exemplary embodiment of the present disclosure, therefore, the engagement element may be engaged without generating shock and noise.

Further, when starting or stopping the engine, the engagement devices are not engaged or disengaged. That is, a torque change resulting from starting or stopping the engine will not be caused simultaneously with a torque change resulting from engaging or disengaging the engagement device. According to the exemplary embodiment of the present disclosure, therefore, the shock can be reduced when starting or stopping the engine.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 4 is a table showing engagement states of engagement devices in each operating mode;

DETAILED DESCRIPTION OF THE PREFERRED EMBODIMENT(S)

Figure 1:
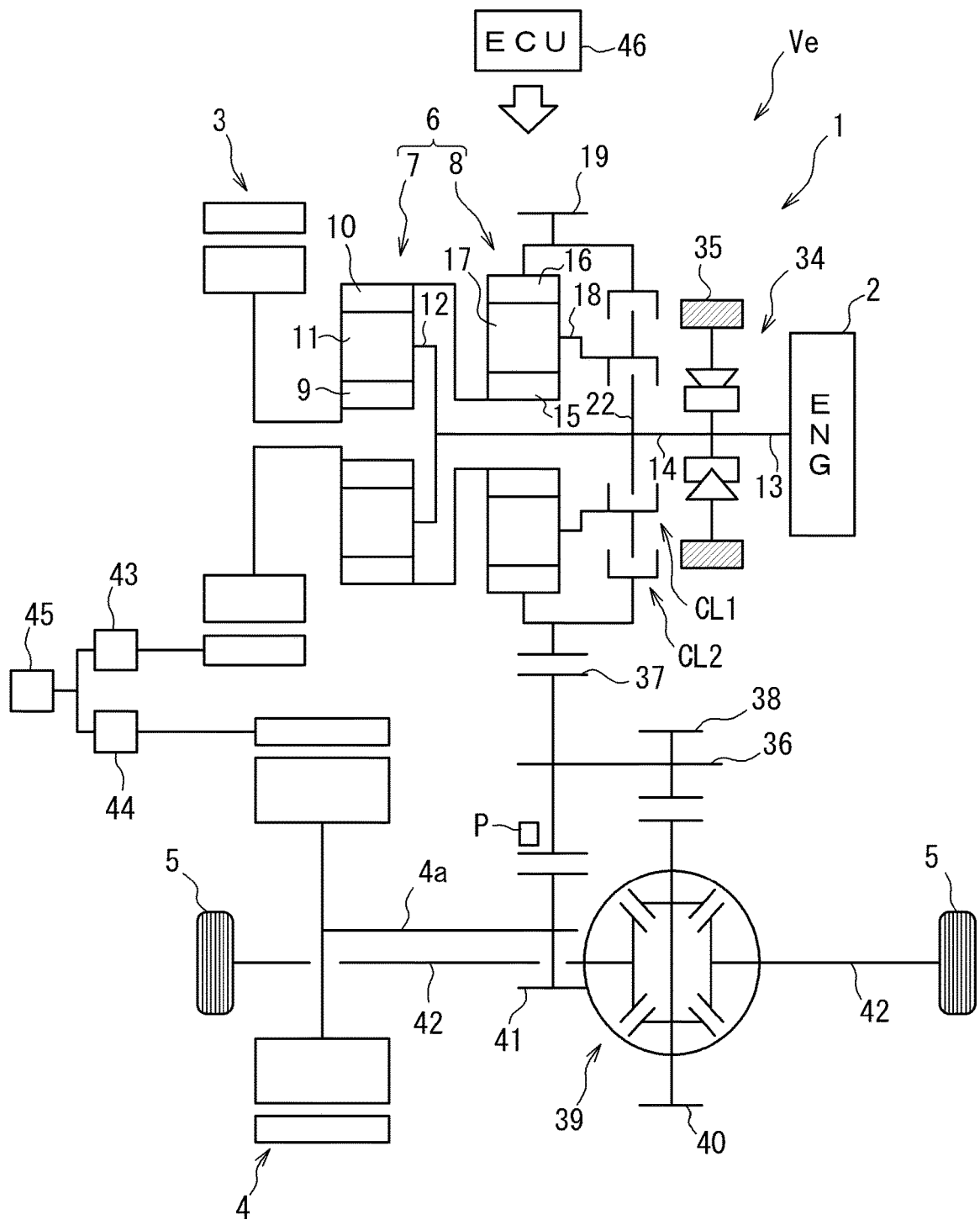
FIG. 1 is a skeleton diagram schematically showing one example of a structure of a power transmission unit to which the control system according to the embodiment of the present disclosure is applied.

Preferred embodiments of the present application will now be explained with reference to the accompanying drawings. Referring now to FIG. 1 there is shown one example of a structure of a power transmission unit 1 of a hybrid vehicle (as will be simply called the "vehicle" hereinafter) Ve to which a control system according to the embodiment of the present disclosure is applied. A prime mover of the vehicle Ve includes an engine 2, a first motor 3 as a first rotary machine, and a second motor 4 as a second rotary machine. For example, a permanent magnet synchronous motor having a generating function (i.e., a motor-generator) may be adopted as the first motor 3 and the second motor 4, respectively.

In the power transmission unit 1, an output power of the engine 2 is delivered to a pair of drive wheels 5 without being translated to an electric power, or while being translated to an electric power. Otherwise, the drive wheels 5 may also be driven by the first motor 3 and the second motor 4. To this end, in the vehicle Ve shown in FIG. 1, a power split mechanism 6 as a differential mechanism is connected to the engine 2. The power split mechanism 6 includes a power split section 7 that distributes torque generated by the engine 2 to the first motor 3 side and to an output side, and a transmission section 8 that alters a torque split ratio of the power split section 7.

For example, a single-pinion planetary gear unit adapted to perform differential action among three rotary elements may be employed as the power split section 7. Specifically, the power split section 7 as a first differential mechanism comprises: a sun gear 9; a ring gear 10 as an internal gear arranged concentrically around the sun gear 9; a plurality of pinion gears 11 interposed between the sun gear 9 and the ring gear 10 while being meshed with both gears 9 and 10; and a carrier 12 supporting the pinion gears 11 in a rotatable manner.

An output shaft 13 of the engine 2 is connected to an input shaft 14 of the power split mechanism 6 connected to the carrier 12 so that the torque of the engine 2 is applied to the carrier 12, and the sun gear 9 of the power split section 7 is connected to the first motor 3. In the exemplary embodiment, accordingly, the input shaft 14 serves as an input member, and the carrier 12 serves as a first input element. As explained later, the first motor 3 establishes a reaction force against an engine torque, therefore, the sun gear 9 serves as a first reaction element of the embodiment. Optionally, an additional gear unit may be interposed between the input shaft 14 and the carrier 12, and a damper device and a torque converter may be interposed between the output shaft 13 and the input shaft 14. Likewise, an additional gear unit may also be interposed between the first motor 3 and the sun gear 9.

The transmission section 8 is also a single-pinion planetary gear unit comprising: a sun gear 15; a ring gear 16 as an internal gear arranged concentrically around the sun gear 15; a plurality of pinion gears 17 interposed between the sun gear 15 and the ring gear 16 while being meshed with both gears 15 and 16; and a carrier 18 supporting the pinion gears 17 in a rotatable manner. Thus, the transmission section 8 as a second differential mechanism is also adapted to perform a differential action among the sun gear 15, the ring gear 16, and the carrier 18. In the transmission section 8, the sun gear 15 is connected to the ring gear 10 of the power split section 7, and the ring gear 16 is connected to an output gear 19. In the exemplary embodiment, accordingly, the ring gear 10 serves as a first output element, the sun gear 15 serves as a second reaction element, the ring gear 16 serves as a second output element, and the output gear 19 serves as an output member.

In order to use the power split section 7 and the transmission section 8 as a complex planetary gear unit, a first clutch CL1 as a first engagement device is disposed to selectively connect the carrier 18 of the transmission section 8 to the carrier 12 of the power split section 7 connected to the input shaft 14. In the exemplary embodiment, accordingly, the carrier 18 serves as a second input element. Specifically, the carrier 12 of the power split section 7 is connected to the carrier 18 of the transmission section 8 by engaging the first clutch CL1 so that the power split section 7 is connected to the transmission section 8 to serve as a complex planetary gear unit. In the complex planetary gear unit thus formed, the carrier 12 of the power split section 7 and the carrier 18 of the transmission section 8 connected to each other serve as an input element, the sun gear 9 of the power split section 7 serves as a reaction element, and the ring gear 16 of the transmission section 8 serves as an output element. That is, the complex planetary gear unit comprises four rotary elements to which external rotary elements such as the engine 2, the first motor 3, the input shaft 14, and the output gear 19 are connected.

A second clutch CL2 as a second engagement device is arranged to rotate the rotary elements of the transmission section 8 integrally. The second clutch CL2 is adapted to selectively connect the carrier 18 to the ring gear 16 or the sun gear 15, or connects the sun gear 15 to the ring gear 16. In the power transmission unit 1 shown in FIG. 1, specifically, the second clutch CL2 selectively connects the carrier 18 to the ring gear 16 to rotate the rotary elements of the transmission section 8 integrally. When the second clutch CL2 is in engagement, the carrier 12 of the power split section 7 serves as an input element, the sun gear 9 of the power split section 7 serves as a reaction element, and the ring gear 16 of the transmission section 8 serves as an output element.

For example, a dog clutch may be adopted as the engagement devices such as the first clutch CL1 and the second clutch CL2, respectively. In the engagement device, dog teeth may be formed on an outer circumferential surface of a rotary member but also on a surface of the rotary member opposed to the other rotary member in an axial direction. According to the exemplary embodiment, the dog teeth are formed on the surface of the rotary member opposed to the other rotary member in the axial direction.

Figure 2:
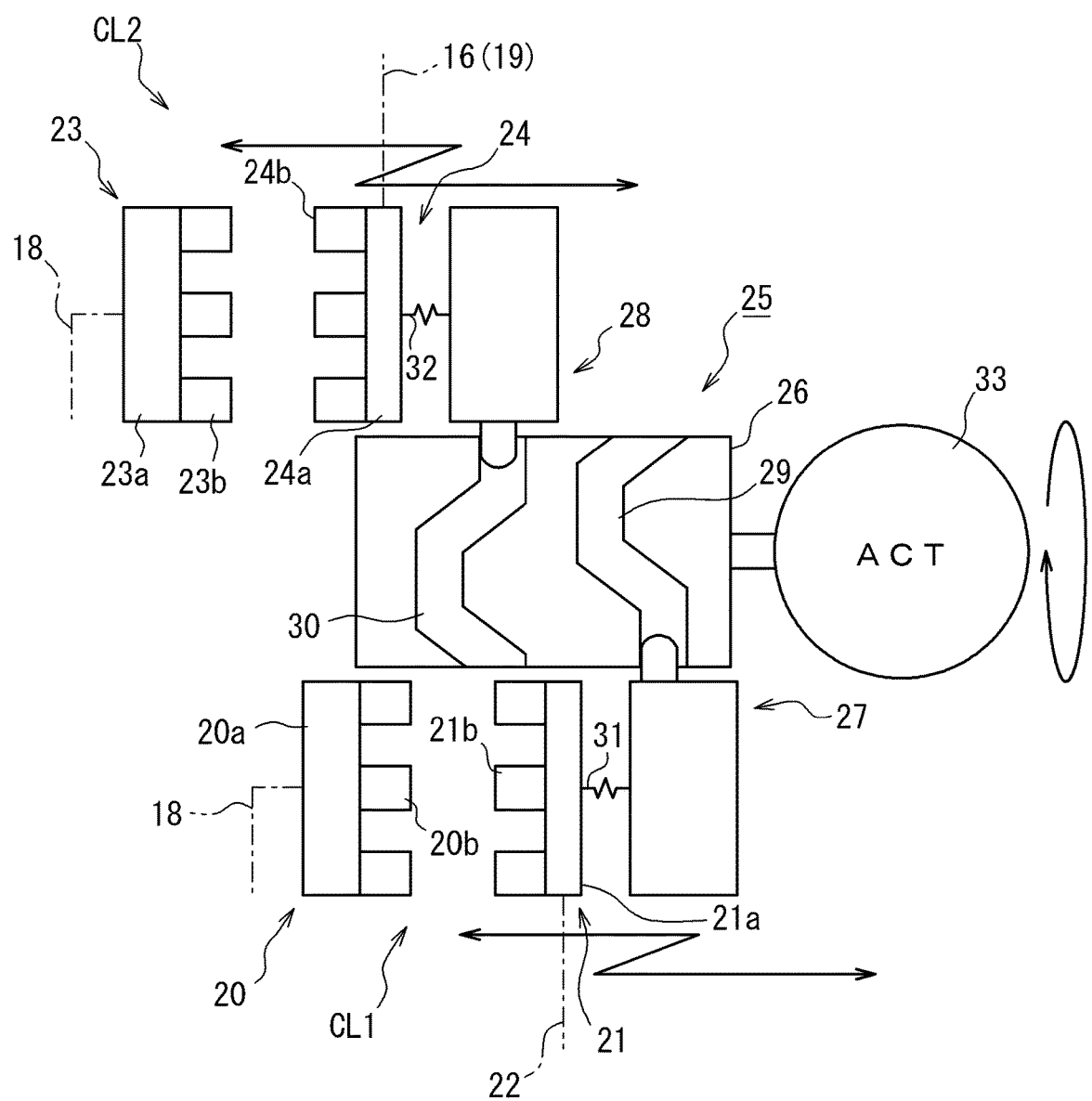
FIG. 2 is a schematic illustration showing one example of structures of clutches and a shift drum for actuating the clutches.

Structures of the first clutch CL1 and the second clutch CL2 are shown in FIG. 2 in more detail. The first clutch CL1 comprises an axially stationary engagement element 20 and a reciprocatable engagement element 21, and the axially stationary engagement element 20 and the reciprocatable engagement element 21 are engaged with each other to transmit torque. The axially stationary engagement element 20 comprises a base portion 20a, and a set of engagement teeth 20b formed on the base portion 20a to protrude toward the reciprocatable engagement element 21. Likewise, the reciprocatable engagement element 21 comprises a base portion 21a, and a set of engagement teeth 21b formed on the base portion 21a to protrude toward the axially stationary engagement element 20. One of the engagement elements 20 and 21 is attached to the carrier 18, and the other one of the engagement elements 20 and 21 is attached to a hub 22 formed integrally with e.g., the input shaft 14 to reciprocate in the axial direction. According to the exemplary embodiment of the present disclosure, the axially stationary engagement element 20 is attached to the carrier 18 and the reciprocatable engagement element 21 is attached to the hub 22, and the reciprocatable engagement element 21 is reciprocated toward and away from the axially stationary engagement element 20.

On the other hand, the second clutch CL2 comprises an axially stationary engagement element 23 and a reciprocatable engagement element 24, and the axially stationary engagement element 23 and the reciprocatable engagement element 24 are engaged with each other to transmit torque. The axially stationary engagement element 23 comprises a base portion 23a, and a set of engagement teeth 23b formed on the base portion 23a to protrude toward the reciprocatable engagement element 24. Likewise, the reciprocatable engagement element 24 comprises a base portion 24a, and a set of engagement teeth 24b formed on the base portion 24a to protrude toward the axially stationary engagement element 23. One of the engagement elements 23 and 24 is attached to the carrier 18, and the other one of the engagement elements 23 and 24 is attached to the ring gear 16 or the output gear 19 to reciprocate in the axial direction. According to the exemplary embodiment of the present disclosure, the axially stationary engagement element 23 is attached to the carrier 18 and the reciprocatable engagement element 24 is attached to the ring gear 16 or the output gear 19, and the reciprocatable engagement element 24 is reciprocated toward and away from the axially stationary engagement element 23.

The reciprocatable engagement element 21 and the reciprocatable engagement element 24 are reciprocated toward and away from the axially stationary engagement element 20 and the axially stationary engagement element 23 respectively by a thrust force established by a cam mechanism 25 as a guide mechanism. The cam mechanism 25 comprises a shift drum 26, a first cam follower 27, and a second cam follower 28.

Specifically, the shift drum 26 is rotated around an axis in parallel to a rotational center axis of the power split mechanism 6, and a first cam groove 29 and a second cam groove 30 are formed on an outer circumferential surface of the shift drum 26 in a circumferential direction in a zigzag manner. The first cam follower 27 is fitted loosely into the first cam groove 29 so that the first cam follower 27 is reciprocated in the axial direction by rotating the shift drum 26 between inner walls of the first cam groove 29. Likewise, the second cam follower 28 is fitted loosely into the second cam groove 30 so that the second cam follower 28 is reciprocated in the axial direction by rotating the shift drum 26 between inner walls of the second cam groove 30. That is, each of the inner walls of the first cam groove 29 and each of the inner walls of the second cam groove 30 serves as a cam surface, respectively.

The cam mechanism 25 should not limited to the above-explained positive cam mechanism that establishes the axial thrust force by the first cam groove 29 and the second cam groove 30. For example, the cam mechanism 25 includes a planer cam such as a face cam mechanism in which a cam follower elastically pushed onto an uneven cam surface of a rotary plate is reciprocated by rotating the rotary plate. In the planer cam of this kind, the cam surface may also be formed on a flat plate, and in this case, the cam follower is reciprocated by sliding the flat plate.

In order to transmit the thrust force of the first cam follower 27 to the reciprocatable engagement element 21 of the first clutch CL1, a first spring 31 as a first elastic member is interposed between the first cam follower 27 and the reciprocatable engagement element 21. Likewise, in order to transmit the thrust force of the second cam follower 28 to the reciprocatable engagement element 24 of the second clutch CL2, a second spring 32 as a second elastic member is interposed between the second cam follower 28 and the reciprocatable engagement element 24. Therefore, when the first cam follower 27 is moved toward the reciprocatable engagement element 21, the reciprocatable engagement element 21 is pushed back toward the first cam follower 27 by the first spring 31 to prevent an undesirable engagement with the axially stationary engagement element 20. Likewise, when the second cam follower 28 is moved toward the reciprocatable engagement element 24, the reciprocatable engagement element 24 is pushed back toward the second cam follower 28 by the second spring 32 to prevent an undesirable engagement with the axially stationary engagement element 23.

The first cam follower 27 is allowed to reciprocate only in the axial direction and the second cam follower 28 is allowed to reciprocate only in the axial direction. When the shift drum 26 is rotated to an angle at which the first cam groove 29 protrudes toward the left side in FIG. 2, the first cam follower 27 is moved toward the left side in FIG. 2 so that the reciprocatable engagement element 21 is pushed toward the axially stationary engagement element 20. Likewise, when the shift drum 26 is rotated to an angle at which the second cam groove 30 protrudes toward the left side in FIG. 2, the second cam follower 28 is moved toward the left side in FIG. 2 so that the reciprocatable engagement element 24 is pushed toward the axially stationary engagement element 23. By contrast, when the shift drum 26 is rotated to an angle at which the first cam groove 29 protrudes toward the right side in FIG. 2, the first cam follower 27 is moved toward the right side in FIG. 2 so that the reciprocatable engagement element 21 is withdrawn from the axially stationary engagement element 20. Likewise, when the shift drum 26 is rotated to an angle at which the second cam groove 30 protrudes toward the right side in FIG. 2, the second cam follower 28 is moved toward the right side in FIG. 2 so that the reciprocatable engagement element 24 is withdrawn from the axially stationary engagement element 23. As illustrated in FIG. 2, according to the exemplary embodiment of the present disclosure, a portion of the first cam groove 29 protruding toward the right side in FIG. 2 and a portion of the second cam groove 30 protruding toward the right the left side in FIG. 2 are out of phase from each other in the rotational direction of the shift drum 26. That is, the first cam follower 27 and the second cam follower 28 are moved toward the left side in FIG. 2 at different rotational angles of the shift drum 26. Likewise, a portion of the first cam groove 29 protruding toward the right side in FIG. 2 and a portion of the second cam groove 30 protruding toward the right side in FIG. 2 are out of phase from each other in the rotational direction of the shift drum 26. That is, the first cam follower 27 and the second cam follower 28 are moved toward the right side in FIG. 2 at different rotational angles of the shift drum 26. Specifically, the first cam groove 29 and the second cam groove 30 are formed on the shift drum 26 in such a manner that: a position at which both of the first cam follower 27 and the second cam follower 28 are withdrawn; a position at which any one of the first cam follower 27 and the second cam follower 28 is pushed forward and the other one of the first cam follower 27 and the second cam follower 28 is withdrawn; and a position at which both of the first cam follower 27 and the second cam follower 28 are moved forward, are set in order in the rotational direction.

The shift drum 26 is rotated by an actuator (referred to as "ACT" in FIG. 2) 33. For example, a stepping motor and a servo motor may be adopted as the actuator 33 so that the shift drum 26 can be rotated at a desired rotational angle. Optionally, in order to multiply a torque of the actuator 33, a speed reducing mechanism may be interposed between the actuator 33 and the shift drum 26. If the face cam is adopted as the cam mechanism 25, an actuator that actuates the cam surface linearly is adopted as the actuator 33.

Turning back to FIG. 1, in order to selectively stop a rotation of the output shaft 13 of the engine 2, a brake 34 is arranged between the output shaft 13 and a stationary member 35 such as a casing. For example, a friction brake and a one-way clutch having sprags allowing single direction rotation may be adopted as the brake 34. In a case of employing the one-way clutch as the brake 34, a counter rotation of the output shaft 13 connected to the input shaft 14 is inhibited by the brake 34.

In the vehicle Ve, the torque of the output gear 19 is delivered to the drive wheels 5, and an electric power generated by the first motor 3 is translated to a kinetic power to be delivered to the drive wheels 5. To this end, a counter shaft 36 extends parallel to a common rotational axis of the engine 2, the power split section 7, and the transmission section 8. A driven gear 37 is fitted onto one end of the counter shaft 36 to be meshed with the output gear 19, and a drive gear 38 is fitted onto the other end of the counter shaft 36 to be meshed with a ring gear 40 of a differential gear unit 39 as a final reduction. A rotation of the driven gear 37 is stopped by a parking lock mechanism P thereby halting the drive wheels 5.

The driven gear 37 is also meshed with a drive gear 41 fitted onto a rotor shaft 4a of the second motor 4 so that a power or torque of the second motor 4 is synthesized with the torque of the output gear 19 at the driven gear 37 to be distributed from the differential gear unit 39 to the drive wheels 5 via driveshafts 42. Instead, the second motor 4 may also be connected to the drive gear 38 to change a torque of the drive gear 38.

A first power control unit 43 is connected to the first motor 3, and a second power control unit 44 is connected to the second motor 4. Each of the first power control unit 43 and the second power control unit 44 individually includes an inverter and a converter. The first power control unit 43 and the second power control unit 44 are connected to each other, and also connected individually to an electric storage device 45 including a lithium ion battery and a capacitor. Therefore, electric power can be exchanged directly between the first power control unit 43 and the second power control unit 44 without passing through the electric storage device 45. For example, when the first motor 3 is operated as a generator while establishing a reaction torque, the electric power generated by the first motor 3 may be supplied directly to the second motor 4 without passing through the electric storage device 45.

Figure 3:
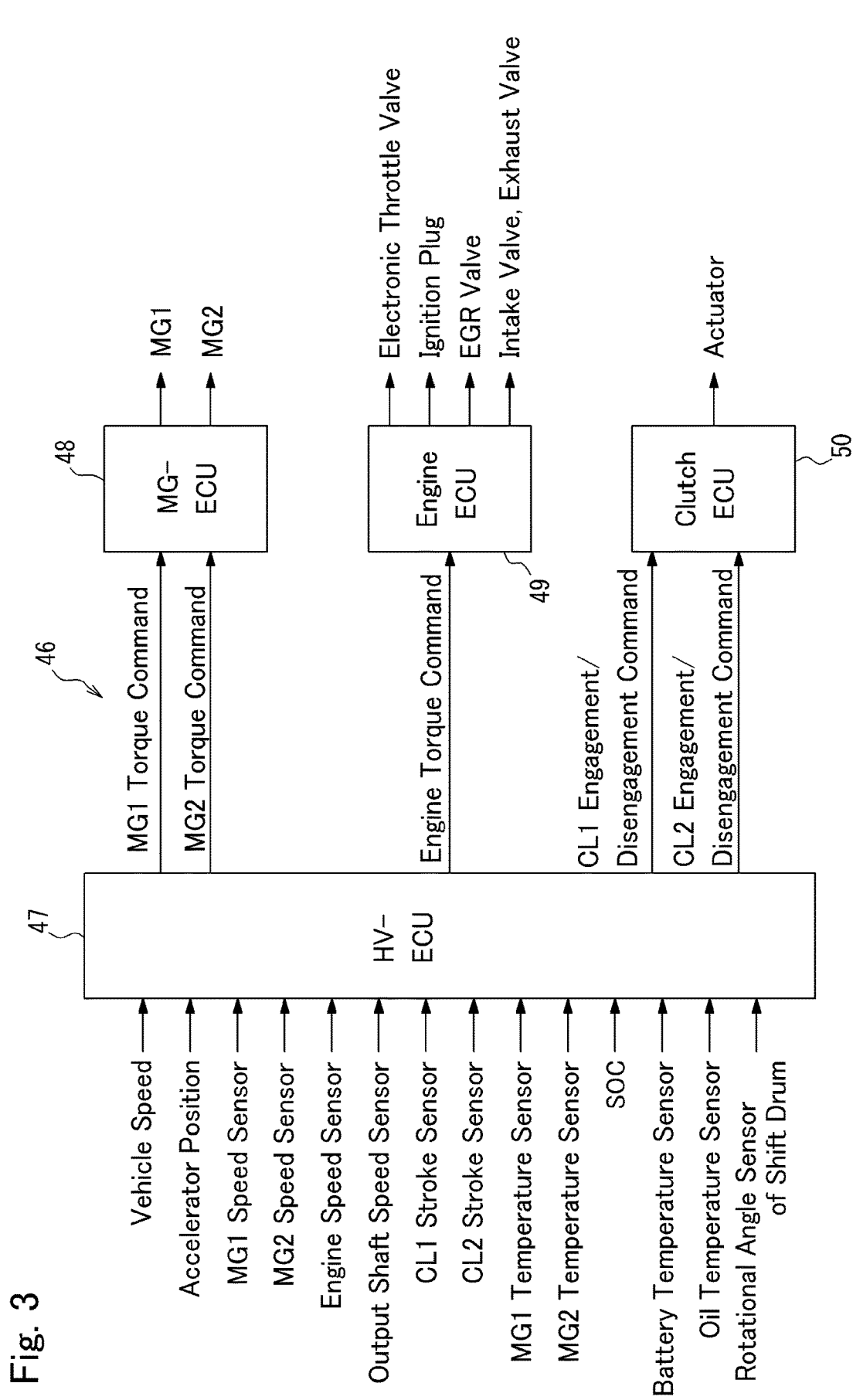
FIG. 3 is a block diagram showing a structure of an electronic control unit.

In order to control the first power control unit 43, the second power control unit 44, the engine 2, the first motor 3, the second motor 4, the actuator 33 and so on, the vehicle Ve is provided with an electronic control unit (to be abbreviated as the "ECU" hereinafter) 46 as a controller. The ECU 46 comprises a microcomputer as its main constituent. A structure of the ECU 46 is shown in FIG. 3 in more detail. Specifically, as shown in FIG. 3, the ECU 46 comprises a hybrid control unit (as will be called the "HV-ECU" hereinafter) 47, a motor control unit (as will be called the "MG-ECU" hereinafter) 48, an engine control unit (as will be called the "engine-ECU" hereinafter) 49, and a clutch control unit (as will be called the "clutch-ECU" hereinafter) 50.

The HV-ECU 47 transmits command signals to the MG-ECU 48, the engine-ECU 49, and the clutch-ECU 50 based on incident data transmitted from various sensors, and maps and formulas installed in advance. For example, the HV-ECU 47 receives data about; a vehicle speed; an accelerator position; a speed of the first motor 3; a speed of the second motor 4; a speed of the output shaft 13 of the engine 2; an output speed such as a rotational speed of the counter shaft 36 of the transmission section 8; strokes of the reciprocatable engagement elements 21 and 24; a temperature of the first motor 3; a temperature of the second motor 4; a state of charge level (SOC) of the electric storage device 45; a temperature of oil (ATF); a rotational angle of the shift drum 26, and so on.

Specifically, based on the above-mentioned data sent to the HV-ECU 47, the HV-ECU 47 calculates output torques of the first motor 3, the second motor 4, and the engine 2, and transmits calculation results to the MG-ECU 48 and the engine-ECU 49 in the form of command signal. In addition, the HV-ECU 47 determines engagement and disengagement of the first clutch CL1 and the second clutch CL2 based on the above-mentioned data sent to the HV-ECU 47, and transmits command signals to engage and disengage the first clutch CL1 and the second clutch CL2 to the clutch-ECU 50.

The MG-ECU 48 calculates current values applied to the first motor 3 and the second motor 4 based on the data transmitted from the HV-ECU 47, and transmits calculation results to the first motor 3 and the second motor 4 in the form of command signals. In the vehicle Ve, an AC motor is adopted as the first motor 3 and the second motor 4 respectively. Therefore, in order to control the AC motor, the command signal transmitted from the MG-ECU 48 includes command signals for controlling a frequency of a current generated by the inverter and a voltage value boosted by the converter.

The engine ECU 49 calculates current values to control opening degrees of an electronic throttle valve, an EGR (Exhaust Gas Restriction) valve, an intake valve, an exhaust valve, and an exhaust valve, and to activate an ignition plug, based on the data transmitted from the HV-ECU 47. Calculation results are transmitted from the engine ECU 49 to the valves and the plug in the form of command signals. Thus, the engine ECU 49 transmits command signals for controlling a power, an output torque, and a speed of the engine 2.

The clutch ECU 50 calculates a rotational angle of the actuator 33 at which the shift drum 26 is rotated to a position possible to engage and disengage the first clutch CL1 and the second clutch CL2 in line with the command signal transmitted from the HV-ECU 47. The calculation result is transmitted from the clutch ECU 50 to the actuator 33. Optionally, the engine 2, the first motor 3, the second motor 4, the first clutch CL1, and the actuator 33 may be controlled by dedicated controllers.

In the vehicle Ve having the power transmission unit 1, an operating mode may be selected from a hybrid mode (to be abbreviated as the "HV mode" hereinafter) in which the vehicle Ve is propelled by a drive torque generated by the engine 2, and an electric vehicle mode (to be abbreviated as the "EV mode" hereinafter) in which the vehicle Ve is propelled by drive torques generated by the first motor 3 and the second motor 4 without activating the engine 2. The HV mode may be selected from a hybrid-low mode (to be abbreviated as the "HV-Low mode" hereinafter), a hybrid-high mode (to be abbreviated as the "HV-High mode" hereinafter), and a fixed mode. Specifically, in the HV-Low mode, torque delivered to the ring gear 16 of the transmission section 8 (or the output gear 19) by generating a predetermined torque by the engine 2 is relatively large. By contrast, in the HV-High mode, the torque delivered to the ring gear 16 of the transmission section 8 by generating the predetermined torque by the engine 2 is relatively small. In the fixed mode, the torque generated by the engine 2 is delivered to the ring gear 16 of the transmission section 8 without being changed.

The EV mode may be selected from a dual-motor mode in which both of the first motor 3 and the second motor 4 generate drive torques to propel the vehicle Ve, and a single-motor mode (or a disconnecting mode) in which only the second motor 4 generates a drive torque to propel the vehicle Ve. Further, the dual-motor mode may be selected from an electric vehicle-low mode (to be abbreviated as the "EV-Low mode" hereinafter) in which a torque of the first motor 3 is multiplied by a relatively larger factor, and an electric vehicle-high mode (to be abbreviated as the "EV-High mode" hereinafter) in which a torque of the first motor 3 is multiplied by a relatively smaller factor. In the single-motor mode, the vehicle Ve is powered only by the second motor 4, while engaging the first clutch CL1, while engaging the second clutch CL2, or while disengaging both of the first clutch CL1 and the second clutch CL2.

FIG. 4 shows engagement states of the first clutch CL1, the second clutch CL2, and the brake 34, and operating conditions of the first motor 3, the second motor 4, and the engine 2 in each operating mode. In FIG. 4, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 2 generates a drive torque, and "OFF" represents that the engine 2 does not generate a drive torque.

Figure 5:
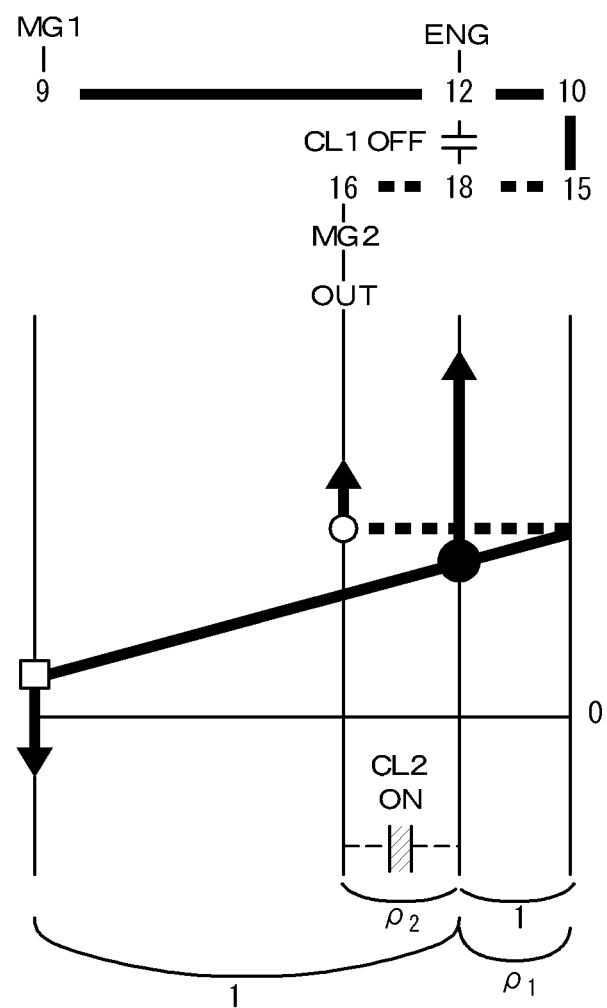
FIG. 5 is a nomographic diagram showing a situation in HV-High mode.
Figure 6:
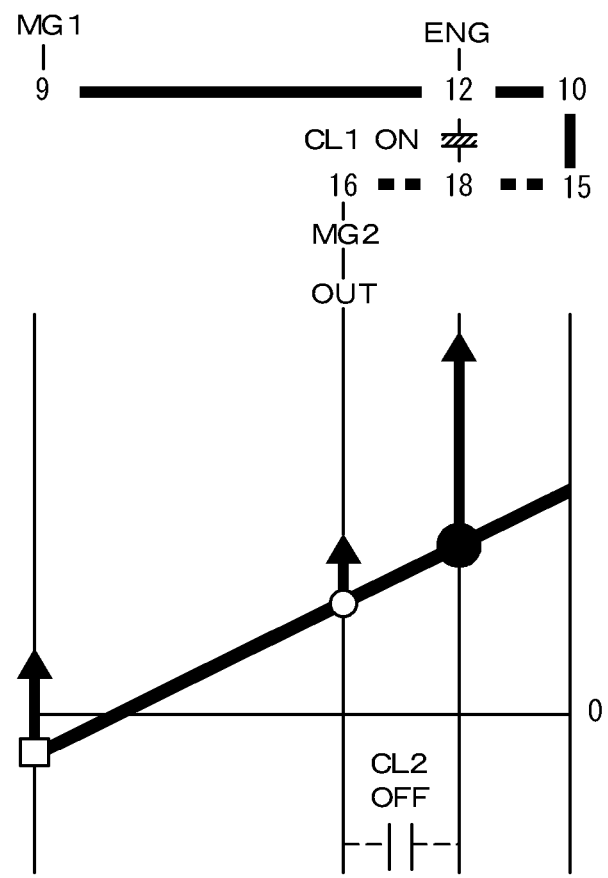
FIG. 6 is a nomographic diagram showing a situation in the HV-Low mode.
Figure 7:
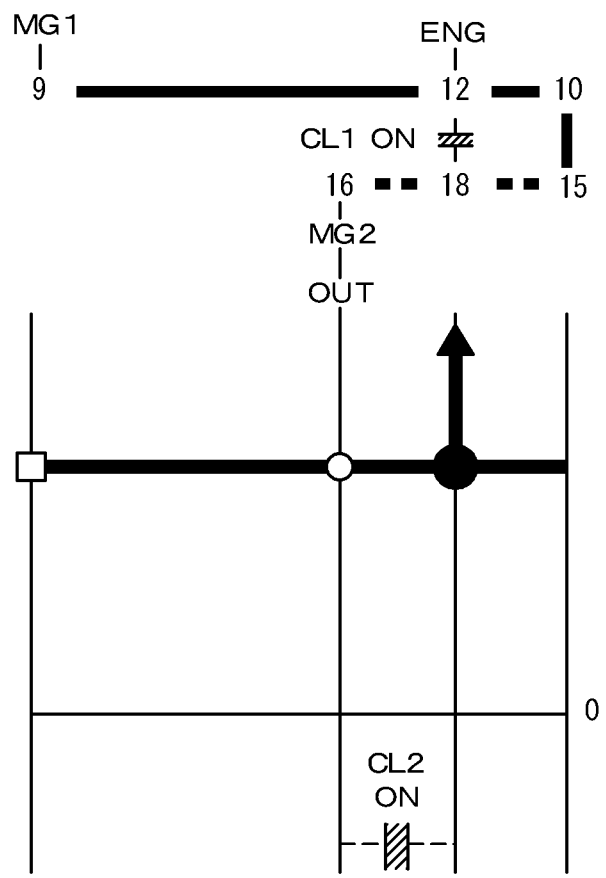
FIG. 7 is a nomographic diagram showing a situation in the fixed mode.

Rotational speeds of the rotary elements of the power split mechanism 6, and directions of torques of the engine 2, the first motor 3, and the second motor 4 in the HV-High mode, the HV-Low mode, and the fixed mode are indicated in FIGS. 5 to 7. In the nomographic diagrams shown in FIGS. 5 to 7, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

As indicated in FIG. 5, in the HV-High mode, the second clutch CL2 is engaged, and the vehicle Ve is propelled by a drive torque generated by the engine 2 while establishing a reaction torque by the first motor 3. As indicated in FIG. 6, in the HV-Low mode, the first clutch CL1 is engaged, and the vehicle Ve is propelled by a drive torque generated by the engine 2 while establishing a reaction torque by the first motor 3.

A magnitude of the reaction torque of the first motor 3 possible to maintain speeds of the engine 2 and the first motor 3 in the HV-High mode differs from a magnitude of the reaction torque of the first motor 3 possible to maintain speeds of the engine 2 and the first motor 3 in the HV-Low mode. Specifically, given that an output torque of the engine 2 is Te, a required magnitude of the reaction torque established by the first motor 3 in the HV-Low mode may be expressed as "($\rho1 \cdot \rho2/(1-\rho1 \cdot \rho2)$)Te", and a magnitude of a torque delivered to the ring gear 16 may be expressed as "($1/(1-(\rho1 \cdot \rho2))$) Te". By contrast, given that the output torque of the engine 2 is Te, a required magnitude of the reaction torque established by the first motor 3 in the HV-High mode may be expressed as "($\rho1/(1+\rho1)$)Te", and a magnitude of a torque delivered to the ring gear 16 may be expressed as "($1/(1+\rho1)$)Te". Thus, the torque delivered from the engine 2 to the ring gear 16 (or the drive wheels 5) is multiplied by different factors in the HV-Low mode and the HV-High mode. In the above-expressed expressions, "$\rho1$" is a gear ratio of the power split section 7 (i.e., a ratio between teeth number of the ring gear 10 and teeth number of the sun gear 9), and "$\rho2$" is a gear ratio of the transmission section 8 (i.e., a ratio between teeth number of the ring gear 16 and teeth number of the sun gear 15). Here, it is to be noted that "$\rho1$" and "$\rho2$" are smaller than 1, respectively.

If the first motor 3 generates a torque greater than the above-explained reaction torque in the HV mode, a speed of the engine 2 is reduced by the torque of the first motor 3 increased from the reaction torque. By contrast, if the first motor 3 generates a torque smaller than the above-explained reaction torque in the HV mode, a speed of the engine 2 is increased by a part of torque generated by the engine 2. That is, in the HV mode, a speed of the engine 2 can be controlled by controlling the torque of the first motor 3. Specifically, in the HV mode, the torque of the first motor 3 is controlled in such a manner as to adjust the speed of the engine 2 to a target speed at which a total energy efficiency in the power transmission unit 1 including a fuel efficiency of the engine 2 and a driving efficiency of the first motor 3 can be optimized. The total energy efficiency in the power transmission unit 1 may be calculated by dividing a total energy consumption by a power to rotate the drive wheels 5.

As a result of establishing a reaction torque by the first motor 3, the first motor 3 serves as a generator. In this situation, a power of the engine 2 is partially translated into an electric power by the first motor 3, and the remaining power of the engine 2 is delivered to the ring gear 16 of the transmission section 8. The electric power thus translated by the first motor 3 may not be only supplied to the second motor 4 to operate the second motor 4 but also accumulated in the electric storage device 45 to raise a state of charge level of the electric storage device 45.

In the fixed mode, both of the first clutch CL1 and the second clutch CL2 are engaged so that all of the rotary elements in the power split mechanism 6 are rotated at a same speed. That is, the output power of the engine 2 will not be translated into an electric energy by the first motor 3 and the second motor 4, and delivered entirely to the drive wheels 5 through the power split mechanism 6. For this reason, a power loss such as a Joule loss associated with such energy conversion will not be caused in the fixed mode and hence power transmission efficiency can be improved.

In principle, the operating mode is shifted between the HV-Low mode and the HV-High mode via the fixed mode upon satisfaction of a shifting condition governed by a required drive force and a speed of the vehicle Ve. Specifically, when the condition to shift the operating mode between the HV-Low mode and the HV-High mode is satisfied, one of the first clutch CL1 and the second clutch CL2 being disengaged is engaged, and thereafter the other one of the first clutch CL1 and the second clutch CL2 being engaged is disengaged. Otherwise, one of the first clutch CL1 and the second clutch CL2 being engaged is disengaged, and thereafter the other one of the first clutch CL1 and the second clutch CL2 being disengaged is engaged. That is, the operating mode is shifted between the HV-Low mode and the HV-High mode via the fixed mode or the disconnecting mode. As can be seen from FIG. 4, although the engine 2 and the first motor 3 are operated in different manners, engagement states of the first clutch CL1 and the second clutch CL2 are identical to each other in the HV-Low mode and the EV-Low mode, and in the HV-High mode and the EV-High mode.

Specifically, the operating mode of the vehicle Ve is shifted in order from the HV-High mode, the fixed mode, the HV-Low mode, the EV-Low mode, the disconnecting mode, the EV-High mode, and the HV-High mode. In order to shift the operating mode in the above-mentioned order, first of all, only the second clutch CL2 is engaged. Then, both of the first clutch CL1 and the second clutch CL2 are engaged, only the first clutch CL1 is engaged, and both of the first clutch CL1 and the second clutch CL2 are disengaged in order. Otherwise, the operating mode of the vehicle Ve may also be shifted in the opposite order from the EV-High mode, the disconnecting mode, the EV-Low mode, the HV-Low mode, the fixed mode, the HV-High mode, and the EV-High mode. In order to shift the operating mode in the above-mentioned order, first of all, only the second clutch CL2 is also engaged. Then, both of the first clutch CL1 and the second clutch CL2 are disengaged, only the first clutch CL1 is engaged, and both of the first clutch CL1 and the second clutch CL2 are engaged in order.

As described, the shift drum 26 is rotated by the actuator 33 so that the first cam follower 27 and the second cam follower 28 are reciprocated respectively in the axial direction along the first cam groove 29 and the second cam groove 30. Consequently, the first clutch CL1 and the second clutch are actuated in the above-explained orders.

As also described, the first clutch CL1 is allowed to transmit torque by engaging the set of engagement teeth 21b with the set of engagement teeth 20b, and the second clutch CL2 is allowed to transmit torque by engaging the set of engagement teeth 24b with the set of engagement teeth 23b. However, the first clutch CL1 and the second clutch CL2 may not be engaged and disengaged smoothly by merely rotating the shift drum 26 to reciprocate the first cam follower 27 and the second cam follower 28. That is, shock and noise will be generated as a result of engaging or disengaging the first clutch CL1 and the second clutch CL2 by rotating the shift drum 26. For example, if tips of the set of engagement teeth 21b pushed by the first cam follower 27 come into contact to tips of the set of engagement teeth 20b in the first clutch CL1, the set of engagement teeth 21b may not be engaged properly with the set of engagement teeth 20b. By contrast, if a contact pressure of each flank of the set of engagement teeth 21b to each flank of the set of engagement teeth 20b is greater than the thrust force to withdraw the set of engagement teeth 21b in the first clutch CL1, the set of engagement teeth 21b may not be disengaged smoothly from the set of engagement teeth 20b.

In the above-explained operating modes, a speed ratio between a speed of the input member and a speed of the output member may be changed continuously without changing a speed of the vehicle Ve. That is, each operating mode of the vehicle Ve is a continuously variable mode. In order to avoid the above-explained disadvantages, the control system according to the exemplary embodiment of the present disclosure is configured to shift the operating mode smoothly utilizing such characteristics of the continuously variable mode. For example, in a case of shifting the operating mode from the High mode to the Low mode in response to a change in a required drive force or a vehicle speed, the ECU 46 executes a routine shown in FIG. 8.

At step S1, it is determined whether it is required to shift the operating mode from the High mode to the Low mode. If the answer of step S1 is NO, the routine returns without carrying out any specific control. By contrast, if the answer of step S1 is YES, the routine progresses to step S2 to reduce a speed difference between engagement elements of the clutch to be engaged. In order to shift the operating mode from the High mode to the Low mode, specifically, the first clutch CL1 is engaged and the second clutch CL2 is disengaged. Accordingly, in the exemplary embodiment of the present disclosure, the first clutch CL1 serves as a "second engagement device", and the second clutch CL2 serves as a "first engagement device".

At step S2, specifically, a synchronization control is executed to reduce a speed difference $\Delta N$ between the axially stationary engagement element 20 and the reciprocatable engagement element 21 of the first clutch CL1 being disengaged. That is, in the power transmission unit 1, the speed difference $\Delta N$ is a speed difference between the carrier 12 of the power split section 7 and the carrier 18 of the transmission section 8. As shown in FIG. 5, in order to reduce the speed difference $\Delta N$ in the High mode, a rotational speed of the first motor 3 is increased in the forward direction as a rotational speed of the engine 2. In the exemplary embodiment of the present disclosure, the axially stationary engagement element 20 and the reciprocatable engagement element 21 of the first clutch CL1 serve as a "third element" and a "fourth element", respectively, and the axially stationary engagement element 23 and the reciprocatable engagement element 24 of the second clutch CL2 serve as a "first element" and a "second element", respectively.

Then, at step S3, it is determined whether the rotational speed of the axially stationary engagement element 20 of the first clutch CL1 is synchronized with the rotational speed of the reciprocatable engagement element 21 of the first clutch CL1. Specifically, at step S3, it is determined whether the speed difference $\Delta N$ has been reduced to zero or equal to or less than a predetermined value a. For example, such determination at step S3 may be made based on a speed of the engine 2, a speed of the vehicle Ve, gear ratios of the power split section 7 and the transmission section 8 and so on. If the speed difference $\Delta N$ has not yet been reduced to zero or equal to or less than the predetermined value a so that the answer of step S3 is NO, the routine returns to step S2 to continue the synchronization of the rotational speeds in the first clutch CL1. By contrast, if the speed difference $\Delta N$ has been reduced to zero or equal to or less than the predetermined value a so that the answer of step S3 is YES, the routine progresses to step S4 to engage the first clutch CL1. At step S3, specifically, the shift drum 26 is rotated at a predetermined angle in a predetermined direction by the actuator 33 thereby moving the first cam follower 27 along the first cam groove 29 to push the reciprocatable engagement element 21 toward the axially stationary engagement element 20.

In this situation, the tips of the set of engagement teeth 21b of the reciprocatable engagement element 21 may be brought into contact to the tips of the set of engagement teeth 20b of the axially stationary engagement element 20. In this case, the first spring 31 is compressed to absorb a reduction in a clearance between the reciprocatable engagement element 21 and the first cam follower 27. Then, when the phases (i.e., rotational angles) of the set of engagement teeth 21b and the set of engagement teeth 20b are shifted away from each other, the reciprocatable engagement element 21 is pushed toward the axially stationary engagement element 20 by the first spring 31 so that the set of engagement teeth 21b is engaged with the set of engagement teeth 20b. In this situation, since the speed difference $\Delta N$ in the first clutch CL1 has already been reduced to zero or equal to or less than the predetermined value a, a large engagement shock will not be generated. In addition, since the rotational speeds of the axially stationary engagement element 20 and the reciprocatable engagement element 21 has been synchronized with each other, the set of engagement teeth 21b may be engaged smoothly with the set of engagement teeth 20b in most cases without causing an interference.

Then, at step S5, a torque applied to the second clutch CL2 to be disengaged is reduced before withdrawing the reciprocatable engagement element 24. To this end, optionally, completion of the engagement of the first clutch CL1 may be determined in this situation, and the torque applied to the second clutch CL2 may be reduced upon completion of the engagement of the first clutch CL1. For example, completion of the engagement of the first clutch CL1 may be determined based on an elapsed time from a commencement of the engagement of the first clutch CL1, or a rotational speed of a predetermined rotary member. That is, according to the exemplary embodiment of the present disclosure, the first clutch CL1 and the second clutch CL2 will not be actuated simultaneously, but actuated in a predetermined order. At step S5, specifically, the torque applied to the second clutch CL2 is reduced by changing torques of the first motor 3 and the second motor 4 in such a manner that a total of the torque of the first motor 3 in the forward direction (i.e., the drive torque) and the torque of the second motor 4 in the counter direction (i.e., the regenerative torque) is adjusted to zero or equal to or less than a predetermined value. Here, the torque of the second motor 4 may be calculated by converting a torque of a rotor shaft into a torque of transmission section 8 based on the gear ratio of the power split mechanism 6.

Thereafter, it is determined at step S6 whether the torque applied to the second clutch CL2 (i.e., a load torque) has been reduced sufficiently as a result of changing torques of the first motor 3 and the second motor 4. Specifically, it is determined at step S6 whether the torque applied to the second clutch CL2 has been reduced to zero or equal to or less than a predetermined torque ß. Instead, the determination S6 may also be made based on whether a predetermined period of time has elapsed from a commencement of the reduction in the load torque. If the torque applied to the second clutch CL2 has not yet been reduced sufficiently so that the answer of step S6 is NO, the routine returns to step S5 to continue reduction in the torque applied to the second clutch CL2. By contrast, if the torque applied to the second clutch CL2 has been reduced sufficiently so that the answer of step S6 is YES, the routine progresses to step S7 to disengage the second clutch CL2, and thereafter returns.

At step S7, specifically, the shift drum 26 is further rotated at a predetermined angle in a predetermined direction by the actuator 33 thereby withdrawing the second cam follower 28 along the second cam groove 30 to isolate the reciprocatable engagement element 24 of the second clutch CL2 from the axially stationary engagement element 23 of the second clutch CL2. In this situation, the torque applied to the second clutch CL2 has already been reduced thereby reducing a contact pressure of each flank of the set of teeth 24b to each flank of the set of teeth 23b. Therefore, friction acting between the set of teeth 24b and the set of teeth 23b has been reduced sufficiently so that the set of teeth 24b can be disengaged smoothly from the set of teeth 23b. That is, the second clutch CL2 may be disengaged by a small thrust force, therefore, the actuator 33, the shift drum 26 and so on may be downsized. In addition, the first clutch CL1 and the second clutch CL2 may be actuated by the common actuator 33 and the shift drum 26, therefore, number of parts required to shift the operating mode of the vehicle Ve can be reduced. For this reason, a structure of the power transmission unit 1 can be simplified to be downsized, and in addition, a weight of the power transmission unit 1 can be reduced.

Figure 8:
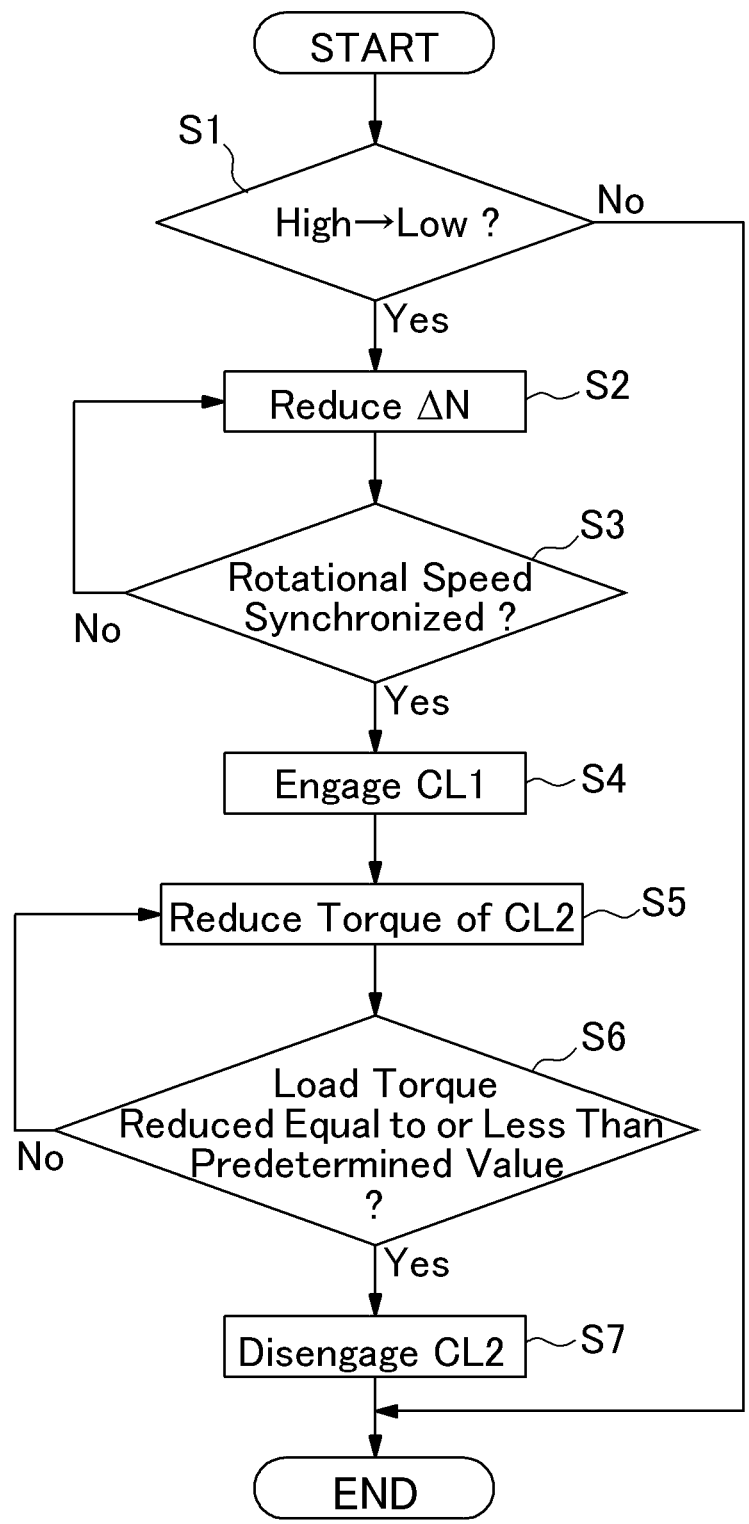
FIG. 8 is a flowchart showing one example of a routine executed by the control system according to the exemplary embodiment.

The routine shown in FIG. 8 may also be applicable to shift the operating mode of the vehicle Ve from the Low mode to the High mode. In any of those cases, speeds and torques of the first motor 3 and the second motor 4 are changed. That is, power generation amounts and power consumptions of the first motor 3 and the second motor 4 are changed during execution of the shifting operation of the operating mode of the vehicle Ve. Therefore, in order to protect the electric storage device 45 from overcharging and overdischarging, a routine shown in FIG. 9 may be executed.

Figure 9:
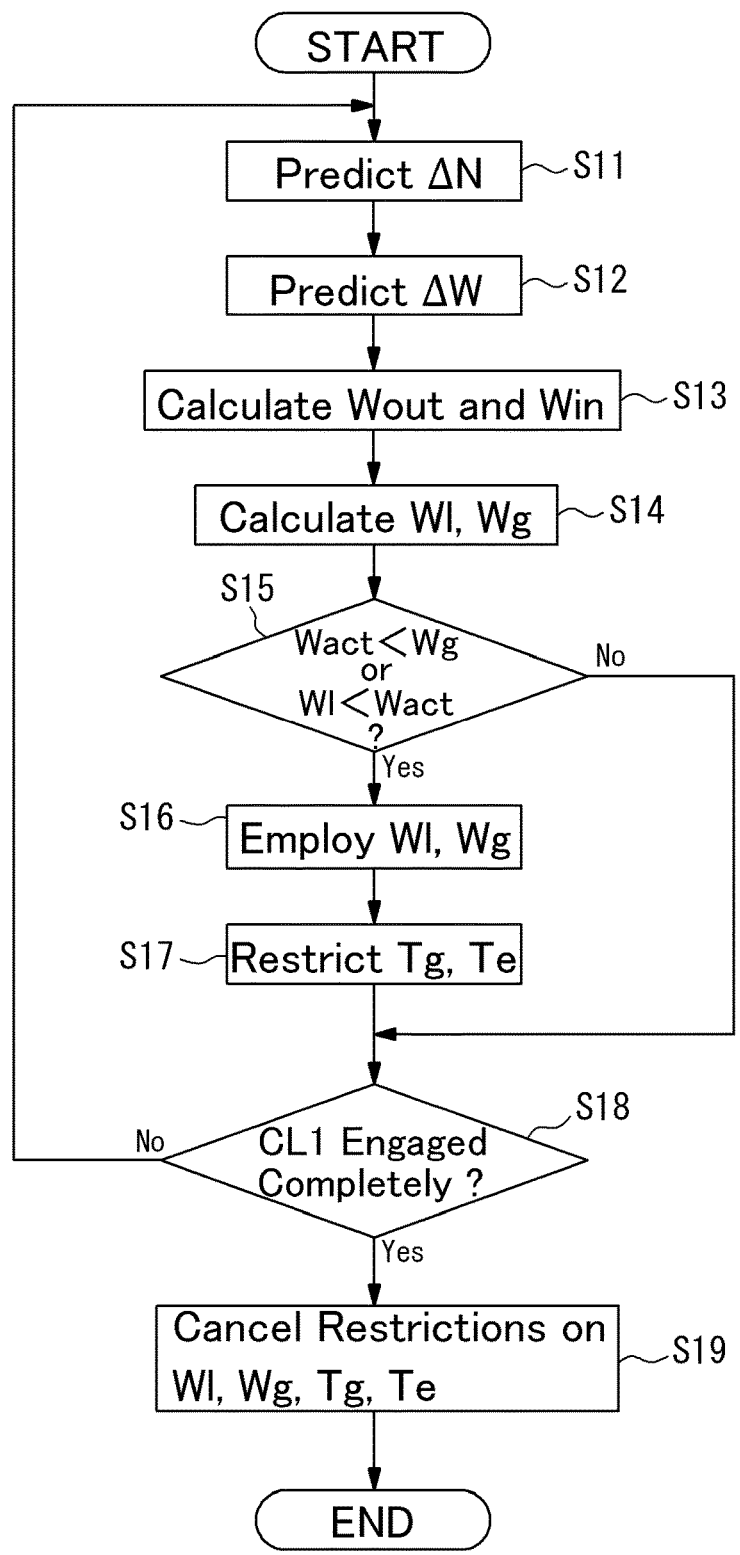
FIG. 9 is a flowchart showing an example of a routine to restrict a change in an electric power when shifting the operating mode.

The routine shown in FIG. 9 is executed when a command to shift the operating mode from the HV-High mode or the HV-Low mode to the fixed mode is transmitted while establishing a reaction torque Tg by the first motor 3. Specifically, the routine shown in FIG. 9 is commenced after a determination to engage the first clutch CL1 or the second clutch CL2 is made. Here, since the operating mode is shifted between the HV-High mode and the HV-Low mode via the fixed mode, the routine shown in FIG. 9 is also executed when shifting the operating mode between the HV-High mode and the HV-Low mode.

Here will be explained an example of shifting the operating mode from the HV-High mode via the fixed mode with reference to FIG. 9. At step S11, a speed difference ΔN between the axially stationary engagement element 20 and the reciprocatable engagement element 21 of the first clutch CL1 being disengaged is estimated. In other words, at step S11, a speed difference ΔN between the carrier 12 of the power split section 7 or the input shaft 14 and the carrier 18 of the transmission section 8 is estimated. Each tip of the set of engagement teeth 20b and the set of engagement teeth 21b of the first clutch CL1 is chamfered respectively, and each tip of the set of engagement teeth 23b and the set of engagement teeth 24b of the second clutch CL2 is chamfered respectively. Therefore, the first clutch CL1 and the second clutch CL2 may be engaged even if the speed difference ΔN between the sets of engagement teeth has not yet been reduced to zero, and an acceptable speed difference between the sets of engagement teeth possible to be engaged to each other is governed by dimensions of the chamfered corner of the engagement teeth. For example, a required time to shift the operating mode may be calculated based on a depressing speed of the accelerator pedal, and the dimensions of the chamfered corner of the engagement teeth may be determined in such a manner that the acceptable speed difference between the sets of engagement teeth to engage the clutch is adjusted to complete the engagement of the clutch within the required time to shift the operating mode.

Then, the routine progresses to step S12 to predict a change amount ΔW of the electric power generated (or consumed) by the first motor 3, on the basis of an expected change in the speed of the first motor 3 given that the first clutch CL1 is engaged in the situation that the speed difference between the carrier 12 and the carrier 18 is ΔN predicted at step S11. For example, the change amount ΔW of the electric power may be predicted by multiplying a current output torque Tg of the first motor 3 by the predicted speed difference ΔN between the carrier 12 and the carrier 18 corresponding to the expected change in the speed of the first motor 3. Optionally, the change amount ΔW of the electric power may also be calculated taking account of an energy consumption due to iron loss or copper loss. Instead, a relation between the speed difference ΔN and the change amount ΔW may be determined in the form of map. In this case, the determination at step S12 may be made based on the speed difference ΔN estimated at step S11 with reference to the map.

Then, the routine progresses to step S13 to calculate a current upper limit input power Win possible to be accumulated in the electric storage device 45 is calculated, and a current upper limit output power Wout possible to be discharged from the electric storage device 45 is calculated. The upper limit input power Win and the upper limit output power Wout are governed by specifications of the electric storage device 45, and vary depending on a temperature and a state of charge level etc. of the electric storage device 45. At step S13, therefore, the upper limit input power Win and the upper limit output power Wout are calculated based on various parameters such as a temperature, a state of charge level etc. of the electric storage device 45 relating to the upper limit input power Win and the upper limit output power Wout. Here, in the following explanations, the output power discharged from the electric storage device 45 will be defined as a positive value, and the input power to the electric storage device 45 will be defined as a negative value.

Thus, the upper limit input power Win to the electric storage device 45 and the upper limit output power Wout from the electric storage device 45 are governed by the specifications and condition of the electric storage device 45, and hence the upper limit input power Win and the upper limit output power Wout are different from a maximum power consumption and a maximum power generation of the first motor 3. That is, the first motor 3 may generate electric power greater than the upper limit input power Win to the electric storage device 45, and may consume electric power greater than the upper limit output power Wout from the electric storage device 45. As described, a power consumption or a power generation of the first motor 3 is changed abruptly when the clutch CL is engaged. Therefore, in order not to apply electric power greater than the upper limit input power Win to the electric storage device 45, and in order not to discharge electric power greater than the upper limit output power Wout from the electric storage device 45, power generation and power consumption of the first motor 3 are restricted before engaging the clutch.

To this end, a current maximum allowable power consumption Wl by the first motor 3 and a current maximum allowable power generation Wg by the first motor 3 are calculated at step S14. For example, the maximum allowable power consumption Wl and the current maximum allowable power generation Wg may be calculated by subtracting the change amount ΔW of the electric power calculated at step S12 from the current upper limit input power Win or the current upper limit output power Wout. In the following explanations, the electric power consumed by the first motor 3 will be defined as a positive value, and the electric power generated by the first motor 3 will be defined as a negative value. Instead, the maximum allowable power consumption Wl and the current maximum allowable power generation Wg may also be calculated with reference to a map determining a relation between: the change amount ΔW; and the current upper limit input power Win and the current upper limit output power Wout.

Thereafter, it is determined at step S15 whether an actual electric power Wact currently being consumed or generated by the first motor 3 is greater than the maximum allowable power consumption Wl or the maximum allowable power generation Wg by the first motor 3. If the actual electric power Wact currently being consumed or generated is greater than the maximum allowable power consumption Wl or the maximum allowable power generation Wg so that the answer of step S15 is YES, the routine progresses to step S16 to employ the maximum allowable power consumption Wl or the maximum allowable power generation Wg so as to restrict a power generation or power consumption by the first motor 3. Here, an actual speed difference ΔN between the carrier 12 and the carrier 18 may be changed from the predicted value of the speed difference ΔN at the point when the first clutch CL1 is engaged due to variation in detected value of a sensor, an engagement delay in the first clutch CL1 and so on. Therefore, a predetermined electric power calculated taking account of such change in the speed difference ΔN may be subtracted from the maximum allowable power consumption Wl and the current maximum allowable power generation Wg.

Then, at step S17, a torque Tg of the first motor 3 is restricted so as to restrict the actual electric power Wact currently being consumed or generated by the first motor 3 equal to or less than the maximum allowable power consumption Wl or the maximum allowable power generation Wg. For example, if the first clutch CL1 is engaged during propulsion in the Low mode while rotating the first motor 3 in the forward direction, the speed of the first motor 3 is increased and consequently the generation amount of the first motor 3 is increased. At step S16, therefore, the maximum allowable power generation Wg of the first motor 3 is set lower than the current upper limit input power Win to the electric storage device 45. Consequently, the torque Tg of the first motor 3 is restricted to reduce the generation amount of the first motor 3 equal to or less than the maximum allowable power generation Wg thereof.

On the other hand, if the torque Tg of the first motor 3 is reduced while maintaining a speed Ne of the engine 2, the speed Ne of the engine 2 is increased, and an increasing rate of the speed Ne of the engine 2 is increased with a reduction in the torque Tg of the first motor 3. That is, as a result of reducing the torque Tg of the first motor 3 at step S17, the speed Ne of the engine 2 may be increased excessively at a rate higher than a target increasing rate. At step S17, therefore, an output torque Te of the engine 2 is also restricted in accordance with a restricted amount of the torque Tg of the first motor 3. Specifically, in the case of reducing the torque Tg of the first motor 3, the output torque Te of the engine 2 is also reduced.

Then, it is determined at step S18 whether the first clutch CL1 is engaged completely. For example, the completion of engagement of the first clutch CL1 may be determined based on the speed difference ΔN between the carrier 12 and the carrier 18. Instead, the completion of engagement of the first clutch CL1 may also be determined based on whether a speed of the first motor 3 is changed by slightly changing the torque Tg of the first motor 3.

If the first clutch CL1 has not yet been engaged completely so that the answer of step S18 is NO, the routine returns to step S11. By contrast, if the first clutch CL1 has been engaged completely so that the answer of step S18 is YES, the routine progresses to step S19 to cancel the restriction on the maximum allowable power consumption Wl or the maximum allowable power generation Wg, and to cancel the restrictions on the torque Tg of the first motor 3 and the output torque Te of the engine 2. Consequently, the condition of the vehicle Ve is returned to the condition before step S16.

By contrast, if the actual electric power Wact currently being consumed or generated is equal to or less than the maximum allowable power consumption Wl or the maximum allowable power generation Wg so that the answer of step S15 is NO, the power consumption or the power generation by the first motor 3 will not exceed the current upper limit input power Win or the current upper limit output power Wout to/from the electric storage device 45. In this case, therefore, the routine skips steps S16 and S77 and progresses to step S18. Here, in the case that the answer of step S15 is NO, the torque Tg of the first motor 3 and the output torque Te of the engine 2 will not be changed even if the maximum allowable power consumption Wl or the maximum allowable power generation Wg is reduced at step S16, and even if the torque Tg of the first motor 3 and the output torque Te of the engine 2 are restricted at step S17. Therefore, the determination at step S15 may be skipped, and the maximum allowable power consumption Wl or the maximum allowable power generation Wg may be reduced at step S16 and the torque Tg of the first motor 3 and the output torque Te of the engine 2 may be restricted at step S17.

Figure 10:
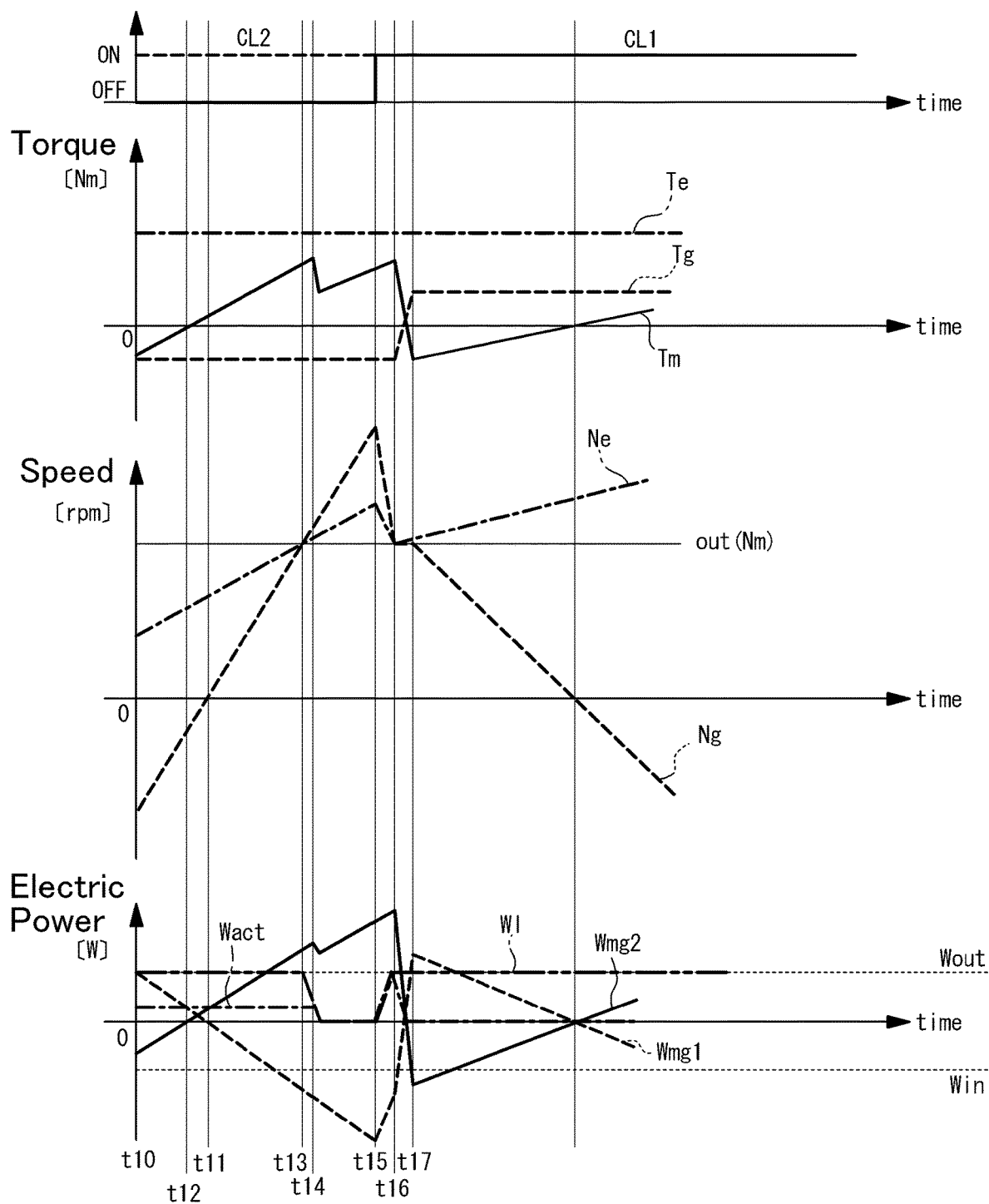
FIG. 10 is a time chart indicating temporal changes in conditions of the power transmission unit during execution of the routine in FIG. 9.

Turning to FIG. 10, there are shown temporal changes in conditions of the first clutch CL1, the second clutch CL2, the first motor 3, the second motor 4, and the engine 2 in a case of restricting the actual electric power Wact being consumed by the first motor 3 within the maximum allowable power consumption Wl by restricting the torque of the second motor 4, by executing the routines shown in FIGS. 8 and 9. In FIG. 10, a torque Tm and a speed Nm of the second motor 4 are indicated as a torque of the output gear 19 or the ring gear 16 for the sake of explanation.

At point t10, the vehicle Ve is propelled in the HV-High mode while generating energy to propel the vehicle Ve only by the engine 2. In this situation, the first motor 3 is rotated in the opposite direction to the rotational direction of the engine 2 while establishing a reaction torque Tg in the direction to increase a speed Ng of the first motor 3. That is, the first motor 3 serves as a motor while being subjected to an energy equal to or greater than the energy to propel the vehicle Ve. In this situation, therefore, the second motor 4 is operated as a generator to translate a surplus energy into an electric power. Specifically, the second motor 4 generates a negative torque Tm in a direction to reduce a speed Nm of the second motor 4.

The condition to shift the operating mode from the HV-High mode to the HV-Low mode is satisfied at point t10, therefore, the first motor 3 is controlled in such a manner as to reduce a speed difference ΔN in the first clutch CL1 between the carrier 12 and the carrier 18. Specifically, at point t10, the first motor 3 is rotated in the opposite direction to the rotational direction of the engine 2, and in order to reduce the speed difference ΔN in the first clutch CL1, the speed Ng of the first motor 3 is increased from a negative value toward the positive value. Eventually, a rotational direction of the first motor 3 will be reversed at point t11, and the speed Ng of the first motor 3 will be further increased in the forward direction. In this situation, the speed Ne of the engine 2 is also increased with the increase in the speed Ng of the first motor 3.

As a result of controlling the torque Tg of the first motor 3 in such a manner as to increase the speed Ne of the engine 2, the energy generated by the engine 2 is partially consumed to increase the speed Ne of the engine 2 and the speed Ng of the first motor 3. Consequently, the above-mentioned surplus energy is reduced, and the negative torque Tm of the second motor 4 is reduced gradually to zero at point t12 which is slightly before point t11. Then, a direction of the torque Tm of the second motor 4 is reversed and the torque Tm of the second motor 4 is further increased in the forward direction. In this situation, an actual electric power Wact as a total amount of an electric power Wmg1 being consumed or generated by the first motor 3 and an electric power Wmg2 being consumed or generated by the second motor 4 is maintained to a constant value from point t10 to point t13.

When the speed Ne of the engine 2, the speed Ng of the first motor 3, and the speed Nm of the second motor 4 are synchronized to one another at point t13, a determination to engage the first clutch CL1 is made and the routine shown in FIG. 9 is commenced. Since the speed Ng of the first motor 3 and the speed Nm of the second motor 4 are high at point t13, both of the electric power Wmg1 being generated by the first motor 3 and the electric power Wmg2 being consumed by the second motor 4 are high at point t13. In this situation, specifically, the electric power Wmg1 being generated by the first motor 3 is slightly less than the electric power Wmg2 being consumed by the second motor 4, and hence the electric power is being discharged from the electric storage device 45. Since the speed difference ΔN in the first clutch CL1 is substantially zero at point t13, the maximum allowable power consumption W1 or the maximum allowable power generation Wg by the first motor 3 will not be restricted.

In the example shown in FIG. 10, the speed Ng of the first motor 3 is increased even after point t13 due to e.g., an overshooting of the speed Ng of the first motor 3. Otherwise, the speed Ng of the first motor 3 may also be increased as a result of engaging the reciprocatable engagement element 21 rotated at a higher speed with the axially stationary engagement element 20. Consequently, the speed difference ΔN in the first clutch CL1 is increased gradually after point t13, and the electric power Wmg1 generated by the first motor 3 by engaging the first clutch CL1 is increased as time proceeds. On the other hand, the torque Tm of the second motor 4 is also increased even after point t13 so as to consume the electric energy regenerated as a result of such increase in the speed Ng of the first motor 3. Consequently, the change amount ΔW of the electric power generated by the first motor 3 which is calculated at step S12 of the routine shown in FIG. 9 is increased so that the maximum allowable power consumption W1 by the first motor 3 is reduced after point t13.

In this situation, the actual electric power Wact is maintained to a constant value after point t13, and hence the maximum allowable power consumption W1 being reduced is equalized to the actual electric power Wact at point t14. As described, according to the example shown in FIG. 10, the overcharge or overdischarge of the electric storage device 45 is prevented by changing the electric power Wmg2 being consumed or generated by the second motor 4. For this purpose, the torque Tm of the second motor 4 is restricted from point t14. Specifically, the electric power Wmg1 generated by the first motor 3 which is to be reduced by engaging the first clutch CL1 is predicted, and the torque Tm of the second motor 4 is restricted in such a manner as to reduce the electric power Wmg2 consumed by the second motor 4 in an amount corresponding to the predicted value of the electric power Wmg1 generated by the first motor 3.

Engagement of the first clutch CL1 starts from point t15, and consequently the speed Ng of the first motor 3 and the speed Ne of the engine 2 are reduced from point t15. Then, when the first clutch CL1 is engaged completely at point t16, the speed Ne of the engine 2, the speed Ng of the first motor 3, and the speed Nm of the second motor 4 are synchronized to one another. That is, the operating mode is shifted from the HV-High mode to the fixed mode at point t16. Thus, although the actual electric power Wact is increased abruptly at point t15 with the reduction in the electric power Wmg1 generated by the first motor 3, the electric power Wmg2 consumed by the second motor 4 is reduced in the amount corresponding to the change in the electric power Wmg1 generated by the first motor 3. At point t16, therefore, the actual electric power Wact is restricted equal to or less than the upper limit output power Wout from the electric storage device 45.

In order to reduce the torque acting on the second clutch CL2, the torque Tg of the first motor 3 and the torque Tm of the second motor 4 are reduced from point t16. Then, when the torque Tg as a regenerative torque of the first motor 3 and the torque Tm as a drive torque of the second motor 4 are reduced to zero, the second clutch CL2 is disengaged at point t17. Consequently, the operating mode is shifted from the fixed mode to the HV-Low mode. After, point t17, the speed Ng of the first motor 3 is controlled in such a manner as to adjust the speed Ne of the engine 2 to a target speed in the HV-Low mode.

Thus, the control system according to the exemplary embodiment of the present disclosure is applied to the power transmission unit in which a rotational speed of one of the rotary elements of the clutch is controlled by the motor establishing a reaction torque to deliver engine torque through the power split mechanism, and in which the operating mode is shifted by engaging the clutch. According to the exemplary embodiment of the present disclosure, before the clutch is engaged, the control system predicts the electric power to be consumed or generated by a change in the speed of the motor to be caused by engaging the clutch, so as to restrict the input power or the output power to/from the electric storage device. That is, when the clutch is engaged, the power consumption or the power generation of the motor being increased is restricted or consumed by the other device. According to the exemplary embodiment of the present disclosure, therefore, overcharge or overdischarge of the electric storage device may be prevented to limit damage to the electric storage device.

Although the above exemplary embodiments of the present disclosure have been described, it will be understood by those skilled in the art that the present disclosure should not be limited to the described exemplary embodiments, and various changes and modifications can be made within the scope of the present disclosure. For example, the routines shown in FIGS. 8 and 9 may also be executed when shifting the operating mode between the hybrid mode and the electric vehicle mode. In this case, in order to avoid generation of shocks due to abrupt change in torque, the clutches will not be engaged and disengaged simultaneously with a starting operation or a stopping operation of the engine, but engaged in the predetermined order.

In addition, three or more clutches may be employed to shift the operating mode. Further, the power transmission unit shown in FIG. 1 may be modified as long as the operating mode is shifted among a plurality of continuously variable mode by manipulating the clutches. Furthermore, the reciprocatable engagement element 21 of the first clutch CL1 and the reciprocatable engagement element 24 of the second clutch CL2 may be actuated in opposite directions.

What is claimed is:

1. A control system for a power transmission unit comprising:
    an input member;
    an output member that outputs torque delivered from the input member;
    a first engagement device that is engaged to establish a first continuously variable mode in which a speed ratio between the input member and the output member may be varied continuously; and
    a second engagement device that is engaged to establish a second continuously variable mode that is different from the first continuously variable mode, in which a speed ratio between the input member and the output member may also be varied continuously,
    wherein the first engagement device comprises a first element having engagement teeth and a second element having engagement teeth, and the engagement teeth of the first element and the engagement teeth of the second element are engaged with each other to transmit torque,
    the second engagement device comprises a third element having engagement teeth and a fourth element having engagement teeth, and the engagement teeth of the third element and the engagement teeth of the fourth element are engaged with each other to transmit torque,
    the power transmission unit further comprising:
    a guide mechanism that establishes a thrust force to reciprocate the second element of the first engagement device and the fourth element of the second engagement device respectively; and
    an actuator that actuates the guide mechanism,
    wherein the guide mechanism is actuated by the actuator in a direction different from a direction to engage and disengage the engagement teeth of the second element of the first engagement device with/from the engagement teeth of the first element of the first engagement device and a direction to engage and disengage the engagement teeth of the fourth element of the second engagement device with/from the engagement teeth of the third element of the second engagement device,
    the control system comprising:
    a controller that shifts an operating mode from the first continuously variable mode to the second continuously variable mode by disengaging the first engagement device being engaged while engaging the second engagement device being disengaged,
    wherein the controller is configured to
    execute a synchronization control to reduce a speed difference between the third element and the fourth element of the second engagement device when shifting the operating mode from the first continuously variable mode to the second continuously variable mode,
    actuate the guide mechanism by the actuator in the direction to engage the engagement teeth of the fourth element of the second engagement device with the engagement teeth of the third element of the second engagement device when the speed difference is reduced equal to or less than a predetermined value, and
    actuate the guide mechanism by the actuator in the direction to disengage the engagement teeth of the second element of the first engagement device from the engagement teeth of the first element of the first engagement device, after the second engagement device has been engaged completely.

2. The control system for the power transmission unit as claimed in claim 1, wherein the controller is further configured to reduce torque applied to the first engagement device, before actuating the guide mechanism by the actuator in the direction to disengage the engagement teeth of the second element of the first engagement device from the engagement teeth of the first element of the first engagement device after the second engagement device has been engaged completely.

3. The control system for the power transmission unit as claimed in claim 1, wherein the guide mechanism comprises:
    a cam surface that actuates the second element of the first engagement device;
    another cam surface that actuates the fourth element of the second engagement device;
    a cam follower that is reciprocated along the cam surface to establish the thrust force to reciprocate the second element of the first engagement device; and
    another cam follower that is reciprocated along said another cam surface to establish the thrust force to reciprocate the fourth element of the second engagement device.

4. The control system for the power transmission unit as claimed in claim 3,
    wherein the guide mechanism further comprises a rotary member having a circular cross-section that is rotated by the actuator,
    the cam surface includes a cam groove that is formed on an outer circumferential surface of the rotary member, and
    said another cam surface includes another cam groove that is formed on the outer circumferential surface of the rotary member.

5. The control system for the power transmission unit as claimed in claim 3, wherein the power transmission unit further comprises:
    an elastic member that is interposed between the cam follower and the first element or the second element of the first engagement device to transmit the thrust force therebetween; and
    another elastic member that is interposed between said another cam follower and the third element or the fourth element of the second engagement device to transmit the thrust force therebetween.

6. The control system for the power transmission unit as claimed in claim 1,
    wherein the power transmission unit further comprises
    a first differential mechanism that performs a differential action among a first input element to which the torque is delivered from an engine via the input member, a first reaction element that is connected to a first rotary machine having a generating function, and a first output element, a second differential mechanism that performs a differential action among a second reaction element that is connected to the first output element, a second output element that is connected to the output member, and a second input element, and a second rotary machine that generates torque by supplying electric power thereto from the first rotary machine, the input member or the first input element is selectively connected to the second input element by any one of the first engagement device and the second engagement device, and at least any two of the second input element, the second output element, and the second reaction element are selectively connected to each other by the other one of the first engagement device and the second engagement device.

7. The control system for the power transmission unit as claimed in claim 6, wherein the controller is further configured to maintain current engagement states of the first engagement device and the second engagement device when starting or stopping the engine.

8. The control system for the power transmission unit as claimed in claim 1, wherein the controller is further configured to disengage one of the first engagement device and the second engagement device after engaging the other one of the first engagement device and the second engagement device, when disengaging the one of the first engagement device and the second engagement device.

* * * * *